3,639,576
RESTERILIZING CONTACT LENS SOLUTION
Hans H. Kaspar and Paul F. Kirk, Sunnyvale, Calif., assignor to Barnes-Hind Pharmaceuticals
No Drawing. Filed June 19, 1968, Ser. No. 738,131
Int. Cl. A61k *27/00*
U.S. Cl. 424—78
9 Claims

ABSTRACT OF THE DISCLOSURE

A rapidly resterilizing contact lens solution having a high degree of comfort for the user, and good retention of these properties on extended storage, is provided, utilizing a combination of partially hydrolyzed polyvinyl alcohol, an anti-microbial organic quaternary ammonium compound, and a small amount of EDTA.

SUMMARY OF THE INVENTION

It has been found in practice that virulent strains of pseudomonas bacteria exist in the field which are not killed by concentrations of anti-microbial organic quaternary ammonium compounds (commonly known as quaternaries) which would be effective for the corresponding bacteria of laboratory strains normally used for testing the resterilizing capacity of such solutions. Its has been found that a small amount of EDTA greatly enhances the effectiveness of the quaternaries so that these wild strains of bacteria found in the field are effectively brought under control. Thus, this combination of quaternaries and EDTA rapidly resterilizes the solutions in which it is contained if it is accidentally inoculated with bacteria during use.

It should be noted that these quaternary ammonium compounds are the preferred anti-microbial for use in ophthamological preparations. The reason for this, especially in the case of solutions which are used repetitively from the same container, is that these quaternaries have a very rapid killing action on microbes which are accidentally introduced into the container. Other anti-microbial agents have been suggested, such as the organic mercurials but the action of these compounds is principally bacteriostatic and they exhibit bactericidal action far more slowly than the quaternaries.

EDTA has previously been used in contact lens solutions as well as other ophthalmic solutions but ordinarily it has been used at concentrations of from 0.05 to 0.2%. (The expression "EDTA" referred to throughout this disclosure refers to ethylene diamine tetraacetic acid. However, the actual compound utilized in the preparation of contact lens solutions may be the acid as such or one of its salts, such as monosodium edetate, disodium edetate, etc.) The mechanism by which EDTA enhances the germicidal effectiveness of quaternaries is not fully understood, but it is probably that its function is to complex cations which might interfere with the germicidal activity of quaternaries.

One of the principal functions of a contact lens wetting solution is its ability to coat the plastic material used in contact lenses with a film which renders the lens safer and more comfortable on insertion. This property is conferred upon it by the incorporation of some hydratable polymeric material which adheres to the plastic. By far the most commonly used polymeric material for this purpose is polyvinyl alcohol. Polyvinyl alcohol is ordinarily produced by the hydrolysis of polyvinyl acetate. The completely hydrolyzed product is not effective in promoting the wetting of contact lenses however, and thus polyvinyl acetate which is not completely hydrolyzed (that is having some residual acetate groups remaining on the polymer chain) is employed.

In accordance with the present invention, it has been found that if a partially hydrolyzed polyvinyl alcohol is used in a contact lens solution together with quaternaries as an anti-bacterial preservative, that the amount of EDTA must be much smaller than the concentrations normally suggested and should be on the order of 0.005 to 0.05%, preferably about 0.02%.

When employing partially hydrolyzed polyvinyl alcohol, it is necessary to maintain the solution at a low pH to insure the chemical stability of the unhydrolyzed acetate groups in the partially hydrolyzed polyvinyl alcohol. If one employs a concentration of EDTA in excess of 0.04%, its buffering capacity will tend to hold the pH on the eye at a low and irritating value. This is due to the fact that it is difficult for the tears to raise the pH to a comfortable level in the presence of the large buffering capacity. With the low values of EDTA of the present invention, the tears do not encounter this resistance since, with its low buffer capacity, the pH is raised to the comfort point so rapidly that the user does not experience irritation.

If one attempts to overcome the disadvantage of higher concentrations of EDTA by providing a neutral pH, no eye irritation will occur, but there will be a rapid hydrolysis of the partially hydrolyzed polyvinyl alcohol causing a loss of wetting ability. In other words, the solution will have deteriorated since it will rapidly lose its wetting ability on storage. Additionally, on standing, such a solution will drop in pH, due to the release of acetic acid from the partially hydrated polyvinyl alcohol, again resulting in irritation to the eye of the user. Moreover, it should be pointed out that having such a neutral pH makes it virtually impossible to sterilize the solution by autoclaving, since this heat treatment would very rapidly accelerate the hydrolysis of the residual acetate group in the partially hydrated polyvinyl alcohol.

Summing up the above, by employing EDTA at a concentration of 0.005 to 0.04%, one achieves a stable solution having excellent stability of the partially hydrolyzed polyvinyl alcohol thus maintaining its wetting ability. The solution has excellent retention and does not cause irritation to the eye of the user. This solution also will not cause irritation to the eye of the user. Moreover, such a solution shows excellent retention of all of the above mentioned properties when stored for prolonged period.

Partially hydrolyzed polyvinyl alcohol, in a concentration ranging from 0.05% to 5.0%, and preferably from 0.5 to 2.5% is essential for the proper wetting of the polymethylmethacrylate plastic ordinarily used for contact lenses. By partially hydrated polyvinyl alcohol is meant polyvinyl alcohol containing from about 1% to 20%, and preferably about 7% to 15%, unhydrolyzed acetate groups. As has been pointed out above, it is necessary to maintain a slightly acid pH or the stability of the partially hydrolyzed polyvinyl alcohol will suffer. The pH range which is suitable for proper stability of the partially hydrated polyvinyl alcohol, as well as lack of serious irritation to the eye, is from about 5.0 to 6.7 and preferably between 5.8 and 6.5.

In contact lens solution, a viscosity-building agent is ordinarily used and any physiologically acceptable thickening agent which is also chemically compatible with the other constituents of the solution, may be used. Examples are hydroxyethylcellulose, methylcellulose, and hydroxypropylcellulose. It should be noted that these thickening agents do not participate in any substantial way with the properties of good wetting, high resterilization capacity, and stability on storage, the proper development of which properties form the basis of this invention and such materials are not essential. Since the polyvinyl alcohol itself also has some viscosity-increasing properties, the amount of the thickening agent, if used, should be correlated with the amount of polyvinyl alcohol, i.e., when larger amounts of polyvinyl alcohol are used, the amount of thickening agent may be reduced, and vice versa, to keep the viscosity within a suitable range.

The wetting solution also contains a physiologically acceptable salt to render the solution compatible with ocular tissues and for this purpose sodium chloride is suitable. Such salts also do not participate in any substantial way with the properties of good wetting, high resterilization capacity, and stability of storage.

In formulating solutions in accordance with the present invention, a combination of quarternaries and EDTA is employed. The quaternaries can be employed in concentrations from 0.002 to 0.02% and preferably 0.004 to 0.015% while the EDTA can be employed in concentrations of 0.005 to 0.04%.

Any anti-microbial quaternary ammonium compound can be used but benzalkonium chloride is preferred because of its ready availability and the fact that it is broadly accepted by the medical profession. However, the invention is not limited to this material and other quaternaries such as cetyl pyridinium chloride, cetrimonium, benzethonium chloride, tolytrimonium methyl sulfate, phenododecinium bromide and the like may be used.

DESCRIPTION OF THE PREFERED EMBODIMENTS

The following non-limiting examples illustrate preferred embodiments of the invention:

Example 1

| | Percent |
|---|---|
| Polyvinyl alcohol 11% unhydrolyzed | 2.0 |
| Benzalkonium chloride | 0.004 |
| Disodium edetate | 0.02 |
| Hydroxyethylcellulose | 0.6 |
| Sodium chloride | 0.9 |
| Sodium hydroxide 0.1 N q.s. | |
| Purified water USP q.s. 100%. | |

The solution is autoclaved at 121° C. for 20 minutes and after cooling the pH is adjusted with sodium hydroxide 0.1 N to 6.5.

Example 2

| | Percent |
|---|---|
| Polyvinyl alcohol 15% unhydrolyzed | 0.1 |
| Benzethonium chloride | 0.002 |
| Sodium edetate | 0.04 |
| Hydroxypropylmethylcellulose NF (low viscosity) | 1.0 |
| Sodium chloride | 0.9 |
| Sodium hydroxide 0.1 N q.s. | |
| Purified water USP q.s. 100%. | |

The solution is autoclaved at 121° C. of 20 minutes and after cooling the pH is adjusted with sodium hydroxide 0.1 N to 5.0.

Example 3

| | Percent |
|---|---|
| Polyvinyl alcohol 5% unhydrolyzed | 3.0 |
| Cetyl pyridinium chloride | 0.02 |
| Disodium edetate | 0.01 |
| Hydroxypropylmethylcellulose NF (high viscosity) | 0.3 |
| Sodium chloride | 0.8 |
| Sodium hydroxide 0.1 N q.s. | |
| Purified water USP q.s. 100%. | |

The solution is autoclaved at 121° C. for 20 minutes and after cooling the pH is adjusted with sodium hydroxide 0.1 N to 6.0.

Example 4

| | Percent |
|---|---|
| Polyvinyl alcohol 1% unhydrolyzed | 5.0 |
| Cetrimonium (Cetrimide - Brit. Ph.) | 0.01 |
| Disodium edetate | 0.005 |
| Sodium chloride | 0.9 |
| Sodium hydroxide 0.1 N q.s. | |
| Purified water USP q.s. 100%. | |

The pH is adjusted to 5.5 with sodium hydroxide 0.1 N. Subsequently the solution is sterilized by bacterial filtration through 0.45 micron pore size bacterial filters.

Example 5

| | Percent |
|---|---|
| Polyvinyl alcohol 15% unhydrolyzed | 1.0 |
| Benzalkonium chloride | 0.015 |
| Disodium edetate | 0.015 |
| Methylcellulose (medium viscosity) | 1.0 |
| Sodium chloride | 0.9 |
| Sodium hydroxide 0.1 N q.s. | |
| Purified water USP q.s. 100%. | |

The pH is adjusted with sodium hydroxide 0.1 N to 6.2. Subsequently the solution is sterilized by bacterial filtration through 0.45 micron pore size bacterial filters.

We claim:
1. A contact lens solution having the following characteristics wherein percentages are expressed on a weight basis:
   (a) from 0.05 to 5.0% of polyvinyl alcohol, said polyvinyl alcohol having 1.0 to 20% residual acetate groups,
   (b) from 0.002 to 0.02% of an anti-microbial organic quaternary compound,
   (c) from about 0.005 to 0.04% of ethylene diamine tetraacetic acid,
   (d) a physiologically acceptable salt in suitable concentration,
   (e) a pH of 5.0 to 6.7.
2. A solution in accordance with claim 1, wherein the concentration of ethylene diamine tetraacetic acid is from 0.005 to 0.02%.
3. A solution in accordance with claim 1, wherein the antimicrobial organic quanternary compound is benzalkonium chloride.
4. A solution in accordance with claim 3, wherein the concentration of benzalkonium chloride is from 0.004 to 0.015%.
5. A solution in accordance with claim 1, wherein the partially hydrolyzed polyvinyl alcohol contains between 7 and 15% of unhydrolyzed acetate groups.
6. A solution according to claim 5, wherein the concentration of partially hydrolyzed polyvinyl alcohol is from 0.5 to 2.5%.
7. A solution in accordance with claim 5, wherein the concentration of partially hydrated polyvinyl alcohol is from 0.05 to 2.5% and the ethylene diamine tetraacetic acid is from 0.005 to 0.04%.
8. A solution in accordance with claim 6, wherein the antimicrobial organic quaternary compound is benzalkonium chloride in a concentration of 0.004 to 0.015% and the ethylene diamine tetraacetic acid is from 0.0005 to 0.04%.
9. A solution in accordance with claim 1, wherein the composition is the following:

| | Percent |
|---|---|
| Polyvinyl alcohol 11% unhydrolyzed | 2.0 |
| Benzalkonium chloride | 0.004 |
| Ethylene diamine tetraacetic acid | 0.02 |
| Hydroxyethylcellulose | 0.6 |
| Sodium chloride | 0.9 |
| Sodium hydroxide 0.1 N to pH 6.5 q.s. | |
| Purified water USP q.s. 100%. | |

References Cited

UNITED STATES PATENTS 3,193,152   5/1965   Szekely et al. _____ 424—78

ALBERT T. MEYERS, Primary Examiner

D. M. STEPHENS, Assistant Examiner

U.S. Cl. X.R.

424—319, 329